United States Patent [19]
Khalidi et al.

[11] Patent Number: 5,446,854
[45] Date of Patent: Aug. 29, 1995

[54] VIRTUAL MEMORY COMPUTER APPARATUS AND ADDRESS TRANSLATION MECHANISM EMPLOYING HASHING SCHEME AND PAGE FRAME DESCRIPTOR THAT SUPPORT MULTIPLE PAGE SIZES

[75] Inventors: Yousef A. Khalidi, Sunnyvale, Calif.; Madhusudhan Talluri, Madison, Wis.; Dock G. Williams, Sunnyvale; Vikram P. Joshi, Fremont, both of Calif.

[73] Assignee: Sun Microsystems, Inc., Mountain View, Calif.

[21] Appl. No.: 139,549

[22] Filed: Oct. 20, 1993

[51] Int. Cl.$^6$ ............................................. G06F 12/10
[52] U.S. Cl. ................................. 395/401; 395/427; 364/DIG. 1; 364/256.3; 364/255.1; 364/246.3
[58] Field of Search ... 364/200 MS File, 900 MS File; 395/400, 425

[56] References Cited

U.S. PATENT DOCUMENTS

| | | | |
|---|---|---|---|
| 4,648,033 | 3/1987 | Lewis et al. | 395/400 |
| 4,792,897 | 12/1988 | Gotou et al. | 395/400 |
| 5,077,826 | 12/1991 | Grohoski et al. | 395/400 |
| 5,313,611 | 5/1994 | Franklin et al. | 395/425 |
| 5,319,761 | 6/1994 | Chiarot et al. | 395/400 |

FOREIGN PATENT DOCUMENTS 0408070  7/1990  European Pat. Off.

OTHER PUBLICATIONS

European Search Report, dated Jan. 24, 1995; Examiner: O. Nielsen; two pages.
Rashid, et al., "Machine-Independent Virtual Memory Management for Paged Uniprocessor Architectures"; IEEE Transactions on Computer, vol. 37, No. 8, Aug. 1988, New York; pp. 896-907.
Patent Abstracts of Japan, vol. 10, No. 60 (P-435) Mar. 11, 1986.
Huck, et al., "Architectural Support for Translation Table Management in Large Address Space Machines", Computer Architecture News, vol. 21, No. 2, May 1993, pp. 39-50.

*Primary Examiner*—Glenn Gossage
*Assistant Examiner*—Matthew Kim
*Attorney, Agent, or Firm*—Blakely Sokoloff Taylor & Zafman

[57] ABSTRACT

A method and apparatus for providing address translations for a computer system having a virtual memory that is mapped onto physical memory. The apparatus has at least one page frame descriptor (PFD) for describing a contiguous portion of physical memory, at least one translation block (TB) for describing a contiguous portion of virtual memory and a hash list. Each PFD has a base physical address (PA), a PA range beginning at the base PA and a translation entry pointer. Each TB has a base virtual address (VA), a VA range beginning at the base VA, and a page size used to map the VA range of the TB. Each TB also has a header and at least one translation entry. Each header has a TB pointer and each translation entry has a backward pointer. Each translation entry of the TB corresponds to a different equalsized translation range of the VA range of the TB. If the translation range of a translation entry is backed by a physical memory page frame, then the backward pointer of the translation entry points to a describing PFD that describes the corresponding page frame and the translation entry pointer of the describing PFD points to the translation entry. The hash list has a plurality of hash entries. Each hash entry has a translation header pointer and an associated hash index unique to the hash entry.

14 Claims, 7 Drawing Sheets

VIRTUAL MEMORY COMPUTER APPARATUS AND ADDRESS TRANSLATION MECHANISM EMPLOYING HASHING SCHEME AND PAGE FRAME DESCRIPTOR THAT SUPPORT MULTIPLE PAGE SIZES

BACKGROUND OF THE INVENTION

1. Field of the Invention

The present invention relates to the field of computer systems. More specifically, the present invention relates to translation between virtual addresses and physical addresses in a virtual memory computer system.

2. Art Background

Virtual memory is a technique that allows an application to see the system as providing a large uniform primary memory, which in reality may be smaller, more fragmented, and/or partially simulated by secondary storage such as a hard disk. Applications access memory through virtual addresses, which are translated (mapped) by special hardware onto physical addresses. Paging and segmentation are two common implementations of virtual memory.

When implementing virtual memory using the paging technique, the virtual address space is divided into a number of fixed-size blocks called pages, each of which can be mapped onto any of the similarly sized physical pages available on the system. Typically, special memory management hardware such as a memory management unit (MMU) or paged memory management unit (PMMU) performs the address translation from virtual addresses to physical addresses. In this type of memory management, any attempt to access data that is not present in physical (system) memory causes the PMMU to send an interrupt signal to the central processing unit (CPU); the operating system then transfers the data in from other storage (such as hard disk), without the application "knowing" about the transfer.

In one virtual memory scheme, there is only one mapping from virtual memory space to physical memory space. In other implementations however, there can be several address spaces, each with its own mapping to the physical address space. Thus, a first process may refer to a given physical address using a first virtual address and a second process running on the same CPU, or on a different CPU in a multi-processor environment, will refer to the given physical address by a second virtual address. In such a case, the two virtual addresses corresponding to the same physical address are referred to as 37 aliases".

Some CPUs are able to operate using more than one size of virtual page. This permits the virtual page size used in a mapping to be selected to best meet the needs of the virtual address space being mapped. If one uses big pages, a large amount of virtual memory can be translated using a single translation entry in the MMU. Therefore, fewer resources are needed for the MMU thereby increasing performance. The use of big pages can, however, lead to memory fragmentation problems not encountered when small pages are used.

SUMMARY OF THE INVENTION

A method and apparatus is described for providing address translations for a computer system having a virtual memory that is mapped onto physical memory. The apparatus has at least one page frame descriptor for describing a contiguous portion of physical memory, at least one translation block for describing a contiguous portion of virtual memory and a hash list.

Each page frame descriptor has a base physical address, a physical address range beginning at the base physical address and a translation entry pointer.

Each translation block has a base virtual address, a virtual address range beginning at the base virtual address, and a page size used to map the virtual address range of the translation block. Each translation block also has a header and at least one translation entry. Each header has a translation block pointer and each translation entry has a backward pointer. Each translation entry of the translation block corresponds to a different equal-sized translation range of the virtual address range of the translation block.

If the translation range of a translation entry is backed by a physical memory page frame, then the backward pointer of the translation entry points to a describing page frame descriptor that describes the corresponding page frame and the translation entry pointer of the describing page frame descriptor points to the translation entry.

The hash list has a plurality of hash entries. Each hash entry has a translation header pointer and an associated hash index unique to the hash entry. If a virtual address translation chain of at least one translation block exists, each translation block of the virtual address translation chain has a virtual address range such that each virtual address of the virtual address range of a translation block of the virtual address translation chain can be hashed to provide a hash index of a same hash entry. The translation header pointer of the hash entry having the hash index obtained will point to a first translation block of the virtual address translation chain. If more than one translation block is in the virtual address translation chain, then the translation block pointer of the first translation block will point to a second translation block in the virtual address translation chain and every translation block of the virtual address translation chain except the first translation block will be pointed to by a translation block pointer of a different translation block of the virtual address translation chain.

BRIEF DESCRIPTION OF THE DRAWINGS

The objects, features, and advantages of the method and apparatus of the present invention will be apparent from the following detailed description of the invention in which.

DETAILED DESCRIPTION OF THE INVENTION

A method and apparatus is disclosed for implementation of a translation mechanism that translates between virtual addresses and physical addresses while simultaneously supporting multiple page sizes. Thus, given a virtual address, the translation mechanism will provide the corresponding physical address (if one exists). Alternately, given a physical address, the translation mechanism will provide the corresponding virtual address (if one exists). In the case where aliasing is permitted, the translation mechanism will provide every virtual address that corresponds to a particular physical address. The translation mechanism supports multiple page sizes by permitting a portion of physical memory to be mapped by one of many sized pages. The translation mechanism also supports multiple page sizes by permitting a big physical page to be multiply mapped by different sized pages.

In the following description, for purposes of explanation, specific numbers, materials and configurations are set forth in order to provide a thorough understanding of the present invention. It will be apparent to one skilled in the art, however, that the present invention may be practiced without the specific details. In other instances, well known systems are shown in diagrammatic or block diagram form in order not to obscure the present invention unnecessarily.

Figure 1:
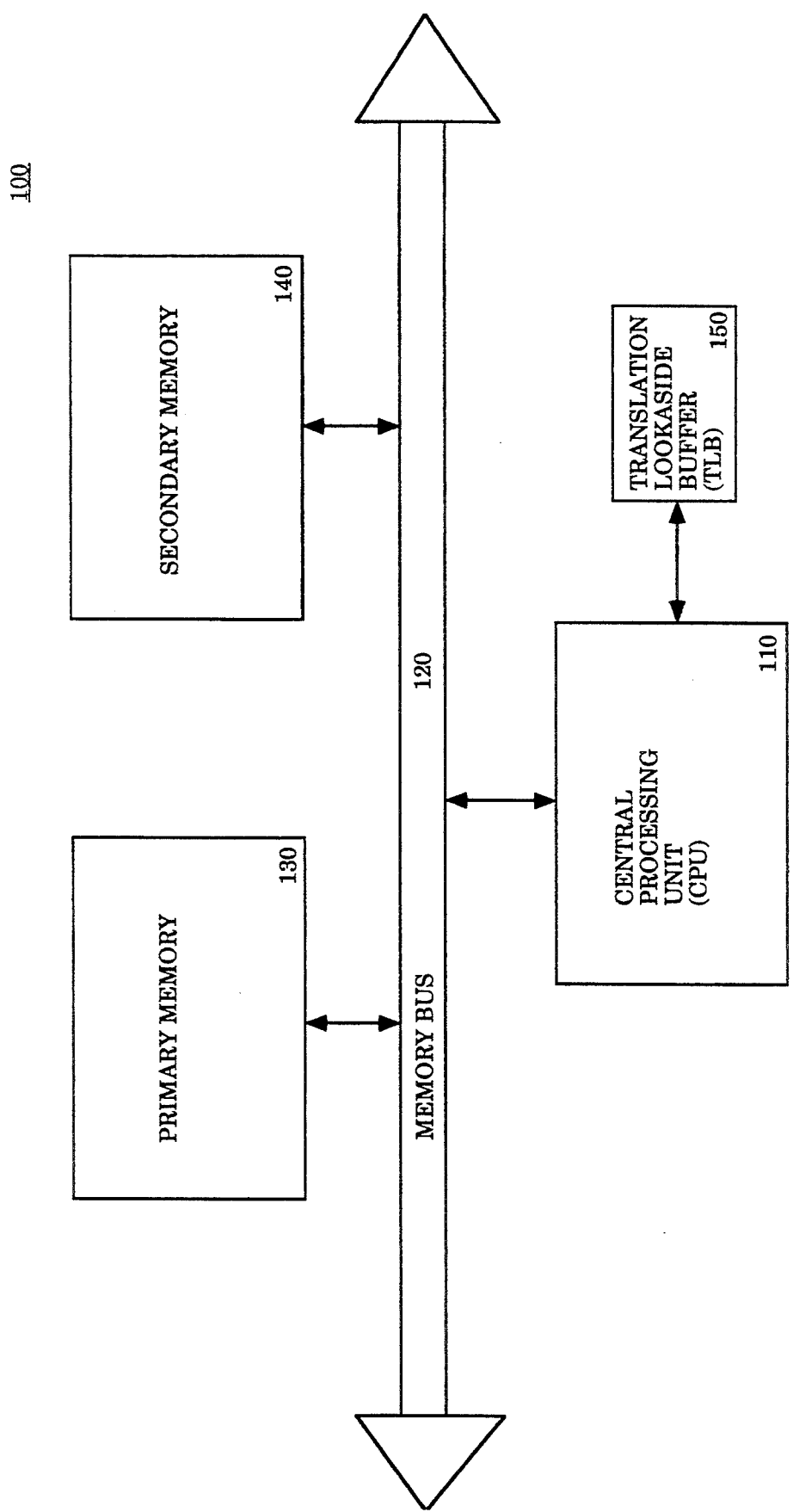
FIG. 1 illustrates a computer system that uses an embodiment of the present invention to perform address translation.

Referring now to FIG. 1, an embodiment of a virtual memory computer system is illustrated that uses an address translation mechanism that supports multiple page sizes. When given a virtual address (VA) to translate, if a corresponding physical address (PA) exists, the address translation mechanism will translate the virtual address to the corresponding physical address. When given a physical address to translate, if a corresponding virtual address exists, the address translation mechanism will translate the physical address to the corresponding virtual address. In the case where aliasing is permitted, the address translation mechanism can find every virtual address corresponding to a given physical address.

In computer system 100 of FIG. 1, central processing unit (CPU) 110 is coupled to primary memory 130 and secondary memory 140 by a memory interconnect such as memory bus 120. In an embodiment of computer system 100, central processing unit 110 can access primary memory 130 faster than it can access secondary memory 140. Secondary memory 140, however, is much larger than primary memory 130. Therefore secondary memory 140 can hold more data than can primary memory 130. In this embodiment, secondary memory 140 is divided into pages and the pages are swapped in and out of primary memory 130 as they are needed by central processing unit 110. In this way, central processing unit 110 can access more memory than is available in primary memory 130 at a speed that is roughly the same as if all of the memory in secondary memory 140 could be accessed with the speed of primary memory 130.

Thus, when central processing unit 110 needs data, primary memory 130 is first checked to determine whether primary memory 130 includes a page that contains the required data. If primary memory 130 does not have the required data, then a page containing the required data is copied into primary memory 130 from secondary memory 140 so that it can be accessed by central processing unit 110.

When a process executing within central processing unit 110 requires data, the process will specify the required data using a virtual address. Translation lookaside buffer (TLB) 150 is a hardware device that contains virtual address to physical address translations for a small set of recently, or frequently, used virtual addresses. Because TLB 150 is implemented in hardware, it can quickly provide central processing unit 110 with a physical address translation of a requested virtual address. TLB 150, however, contains translations for only a small set of possible virtual addresses. If TLB 150 cannot provide the address translation requested by central processing unit 110, then another translation mechanism is used to provide the address translation requested.

For maintenance purposes there is also an ability to provide a translation from a physical address to every corresponding virtual address. For example, when a page is flushed out of physical memory, one can find all of the virtual addresses that are backing the page being flushed so that every corresponding translation table entry can be invalidated. There are also times when the step of calculation of the translation from physical address to virtual address will not be necessary, but it will still be necessary to locate the virtual pages that back a particular physical page. For example, it may be necessary to examine, or to change, one or more of the attributes associated with one or more of the virtual pages that back a particular physical page that contains a particular physical address.

For simplicity, hereinafter it will be understood that whenever a reference is made to performing a physical address to virtual address translation, the reference will include the cases where the virtual pages backing a particular physical page that contains a particular physical address are identified but the step of actually calculating the virtual addresses that correspond to the particular physical address is not performed. Similarly, there are also times when the step of calculation of the translation from virtual address to physical address will not be necessary, but it will still be necessary to locate the translation entry or page frame descriptor that backs a particular virtual page (e.g. to examine, or to change, one or more of the attributes). Again, for simplicity, hereinafter it will be understood that whenever a reference is made to performing a virtual address to physical address translation, the reference will include the cases where the physical page that contains a physical address that corresponds to a particular virtual address is identified but the step of actually calculating the physical address that corresponds to the particular virtual address is not performed.

Figure 2:
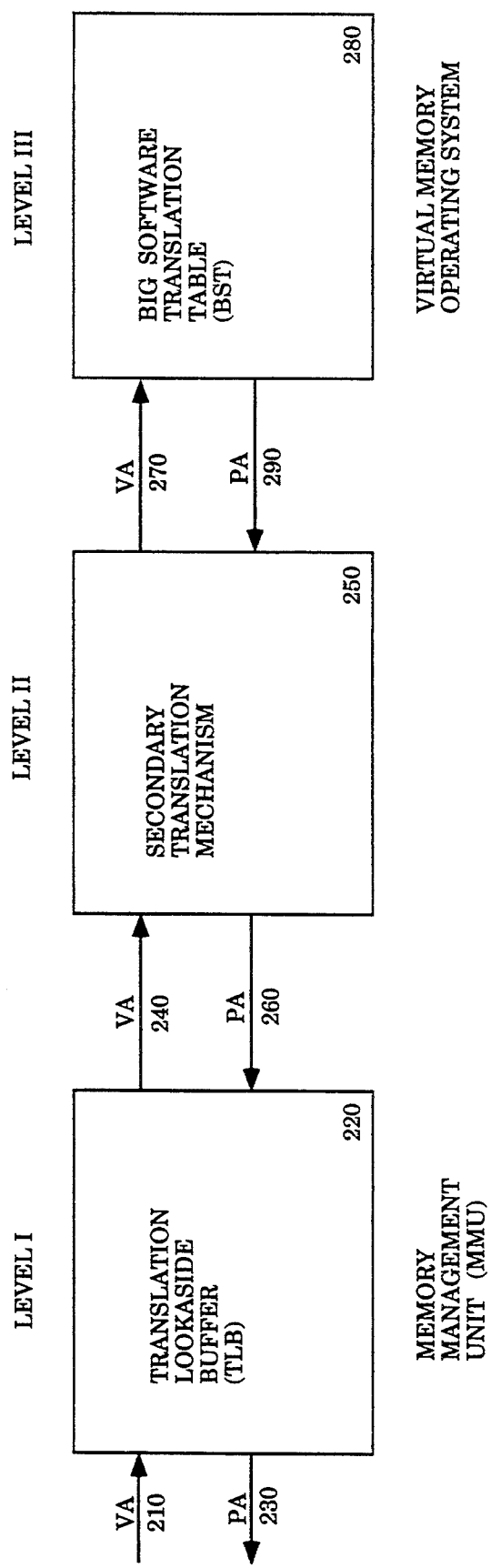
FIG. 2 illustrates a multi-level approach for translating virtual addresses to physical addresses.

Referring now to FIG. 2, the hierarchical structure for one embodiment of the present invention is depicted. In FIG. 2, a three-level translation hierarchy is depicted. Whenever a CPU requires a virtual address to be translated to a physical address, a translation attempt is made at Level I. In FIG. 2, Level I is depicted as being a memory management unit (MMU) such as translation lookaside buffer (TLB) 220. As described above, Level I is typically implemented in hardware and is characterized by providing a fast translation for a small number of addresses. The set of addresses that can be translated at Level I changes dynamically with elements of the translation set being updated in order to insure that the most likely needed translations will be available at Level I.

Level II is exemplified by a translation storage buffer (TSB). In an embodiment of the present invention, the TSB is implemented in primary memory. Therefore, while not as fast as TLB 220, the TSB can maintain a larger set of translation elements than can TLB 220. Thus, when TLB 220 is unable to provide a translation (a TLB "miss"), the TSB is tested to determine whether the required translation is stored in the TSB. If the translation can be provided by the TSB (a TSB "hit") then the translation is provided to the CPU and to the translation lookaside buffer 220. If, on the other hand, the TSB cannot provide the translation (a TSB "miss") then a Level III translation is performed.

A Level III translation is characterized by being slower than a Level II translation and by being comprehensive. Typically, the virtual memory operating system will provide a big software translation table (BST) 280 that is stored in data storage. For example, the data storage can be provided as primary memory, as secondary memory or as a combination of both primary and secondary memory. BST 280 contains every translation from virtual address space to physical address space that exists. Therefore, while a Level III translation will take a relatively long time, it will result in a translation being found if one exists. When a Level III translation is made, the results are provided to the CPU, to the translation storage buffer and to the translation lookaside buffer 220.

To summarize FIG. 2, a Level I translation is performed when the CPU generates a virtual address request (210) to a Level I translator such as TLB 220. If the Level I translation is successful, the Level I translator will provide the requested physical address (230) that corresponds to the requested virtual address 210.

If the Level I translation fails, then a virtual address request 240 will be made to a Level II translator such as the TSB. If the Level II translation is successful, then the physical address 260 corresponding to the virtual address request 240 will be returned to the Level I translator and then to the CPU (physical address 230).

If, on the other hand, the Level II translation fails, then virtual address request 270 will be sent to a Level III translator such as BST 280. Because BST 280 is comprehensive, if a physical address translation exists, it will be returned to the Level II translator (TSB) as physical address 290. The translation will also be provided to the Level I translator (TLB 220) as physical address 260 and, ultimately, will be provided to the CPU as physical address 230.

While the present invention is being described in an example embodiment containing three levels of translation, alternate embodiments exist that contain more, or fewer, levels of translation. Furthermore, while the present invention is described in an embodiment of a Level III big software translation table such as BST 280, an alternate embodiment of the present invention would be one wherein the described translation mechanism is used as a Level I translator, or more likely, as Level II translator.

Figure 3:
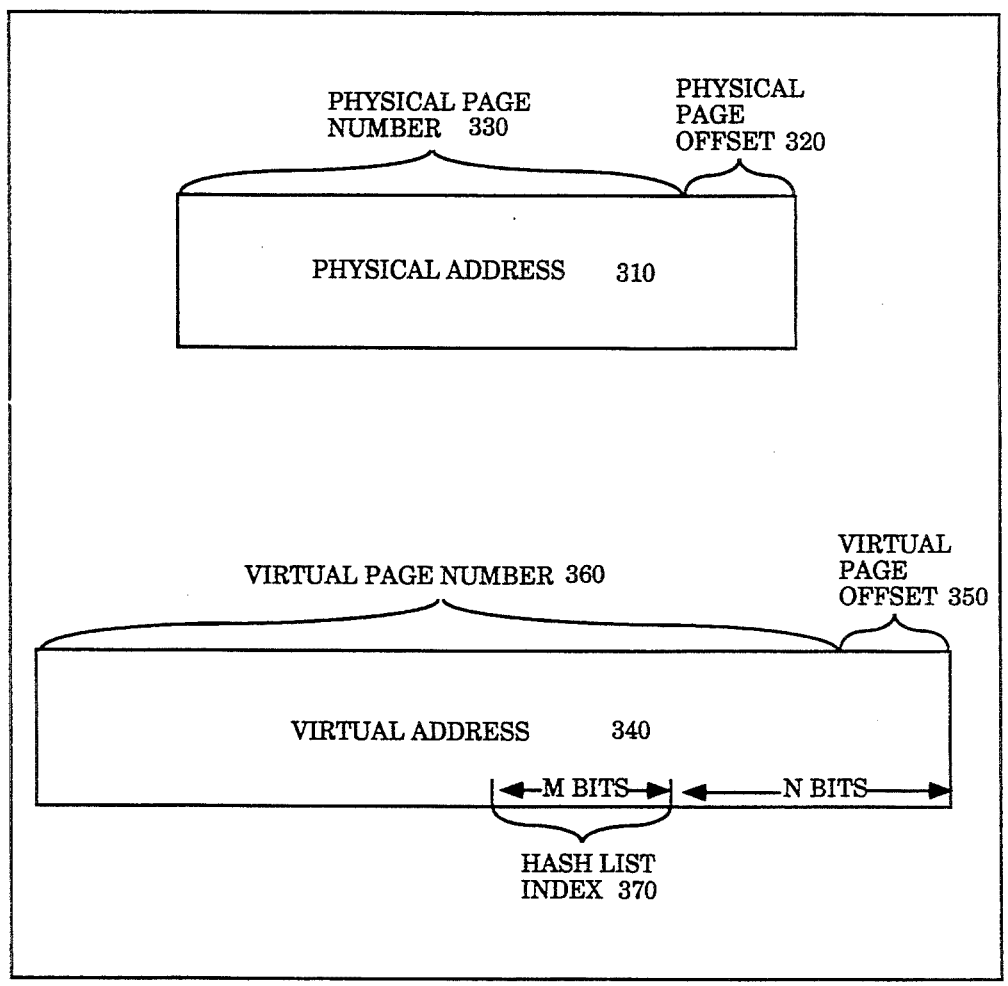
FIG. 3 illustrates the relationship between physical addresses and virtual addresses and how a hash index is derived from a virtual address.

Referring now to FIG. 3, the relationship between physical and virtual addresses is depicted. FIG. 3 further illustrates the derivation of a hash index that is used when making virtual to physical address translations. In FIG. 3, physical address 310 is depicted as being comprised of a physical page offset 320 and a physical page number 330. A physical page is a contiguous portion of physical memory. Conceptually, the physical page can be thought of as being divided into a set of "rows"— wherein a row represents the smallest set of data that can be addressed individually. Physical page offset 320 specifies the row being addressed within a given physical page. Physical page number 330 specifies which page from the set of physical pages is being selected.

Physical pages can be of varying sizes. A big page will have more rows than a small page. It follows that a given amount of physical memory can be divided into fewer big pages than into small pages. Therefore, more bits of physical address 310 will be devoted to physical page offset 320 for a big page than for a small page. Correspondingly, fewer bits of physical address 310 will be devoted to physical page number 330 for a big page than for a small page.

If the number of rows in a given page is constrained to be an integral power of two, and if the total number of physical pages for a given page size is also constrained to be an integral power of two, then it follows that physical address 310 can be represented as an $K+L$ bit binary number wherein K bits of physical address 310 are used to designate physical page number 330 and L bits of physical address 310 are used to designate physical page offset 320.

A physical address range can be treated as though it is one big page or several smaller pages. In one embodiment, a 40 bit physical address space is used. This physical address space is mapped using small pages that are 8 KB in size and big pages that are 64 KB in size. In this embodiment, physical address 310 is a 40 bit binary number. When a small (8 KB) page is being addressed, the 13 least significant bits (LSbs) ($2^{13}=8K$) of physical address 310 will represent physical page offset 320. The 27 most significant bits (MSbs) of physical address 310 will specify the physical page number 330 for a given small page. On the other hand, if a large (64 KB) page is being used, the 16 least significant bits ($2^{16}=64K$) of physical address 310 will be used to provide the physical page offset 320 for the big page. In the case of big pages, the 24 MSbs of physical address 310 will be used to specify a given physical page number 330 for a given physical page.

Referring now to virtual address 340, it can be seen that virtual address 340 is divided into a virtual page offset 350 and a virtual page number 360 in a manner similar to the division of physical address 310. Although a virtual address 340 can be mapped by many different page sizes, once a page size is selected for a given virtual address, the given virtual address can be mapped by only one page size at any given time. For a given page size, a virtual page offset 350 will equal the corresponding physical page offset 320. Because virtual memory techniques are typically used to map a larger virtual address space into a smaller physical address space, for a given page size, there will usually be more virtual pages than physical pages.

In an example embodiment, virtual address 340 is a 64 bit binary number representing a virtual address space of size $2^{64}$. In the case where a small page of size 8 KB is used, virtual page offset 350 will be the 13 LSbs of virtual address 340 and virtual page number 360 will be the 51 MSbs of virtual address 340. Similarly, in the case where a big page of size 64 KB is used, virtual page offset 350 will be the 16 LSbs of virtual address 340 and virtual page number 360 will be the 48 MSbs of virtual address 340. Throughout the rest of the detailed description, unless otherwise noted, an example embodiment having a 40 bit physical address space, a 64 bit virtual address space and big and small page sizes of 64

KB and 8 KB, respectively, will be described. In alternate embodiments, different sizes can be used for the virtual and physical address spaces, as well as for the big and small pages. Furthermore, in an alternate embodiment, more than two page sizes can be used. Moreover, in yet another alternate embodiment, there is a larger physical address space than virtual address space.

In one embodiment, hash list index 370 is formed, in a manner that will be described below in connection with FIG. 5, from the M most significant bits of the M+N least significant bits of virtual address 340. The hash list index 370 is then used to index into a hash table when translating a virtual address 340 to its corresponding physical address 310.

Figure 4:
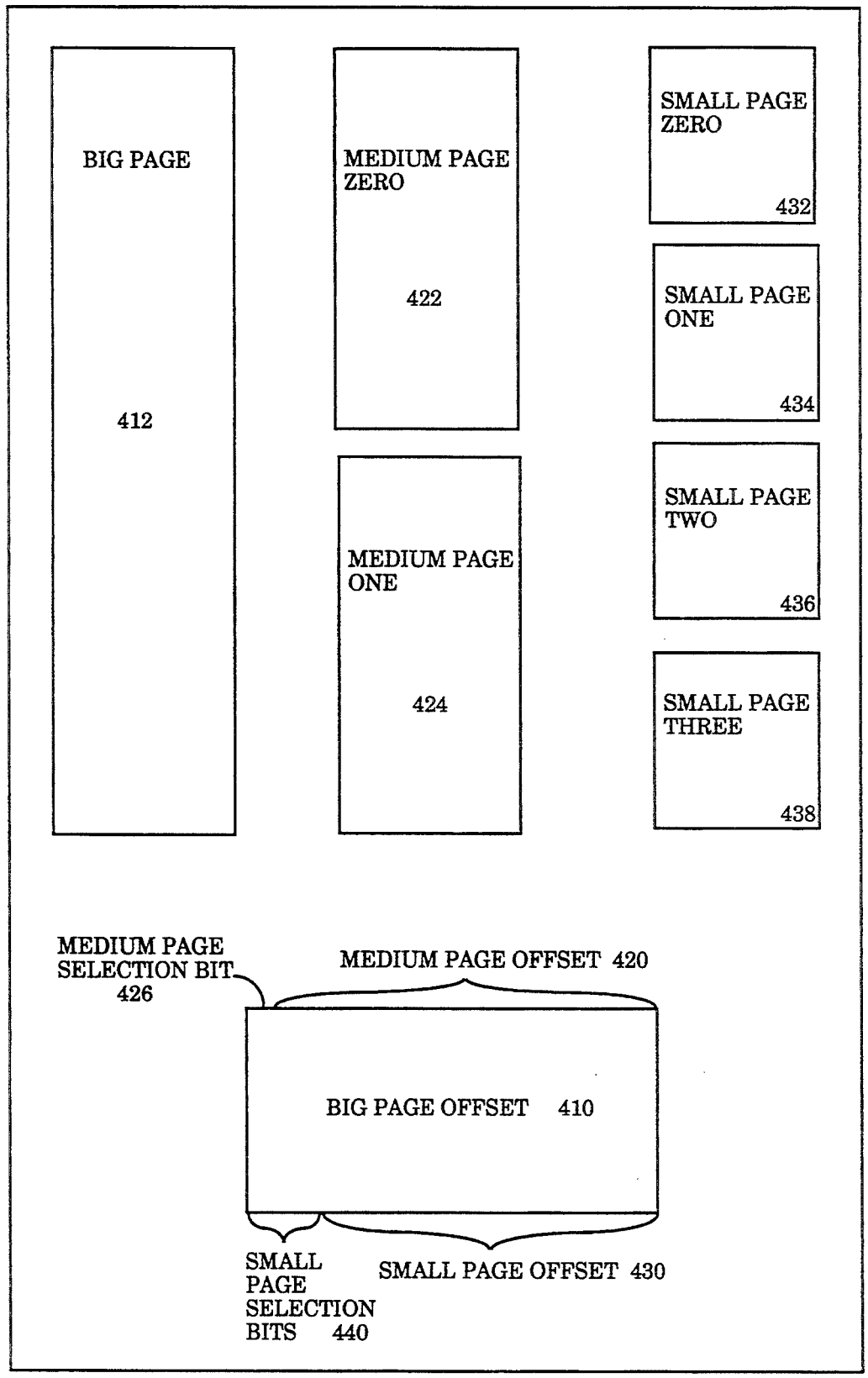
FIG. 4 illustrates the mapping of multiple page sizes onto a contiguous portion of physical memory.

Referring now to FIG. 4, the mapping of three different sized pages onto one contiguous portion of memory is illustrated. In FIG. 4, big page 412 maps a contiguous portion of physical memory. Big page 412 can be considered to be comprised of a series of rows wherein each row of the page can be specified by giving the offset from the "top" of big page 412. In such a case, big page offset 410 is a field that is used to specify an individual row within the page. Thus, for example, if big page 412 was comprised of 16K rows, big page offset 410 would be a 14 bit field ($2^{14}=16K$).

Alternately, the same portion of memory mapped by big page 412 could be mapped by two medium size pages wherein each of the medium size pages was half the size of big page 412. This is illustrated by medium page zero 422 and medium page one 424. The high order bit of the big page offset field 410 can be used to specify which of the two medium sized pages is being referenced. The remaining least significant bits of big page offset 410 then provide the medium page offset 420 into the particular medium sized page being referenced. Thus, in the case where medium page offset 420 has the value zero and medium page selection bit 426 also has the value zero, the first row of medium page zero 422 would be addressed. Comparing this with big page 412 and big page offset 410, one can see that the first row of big page 412 would also be specified in such a case.

On the other hand, in the case where the medium page offset field was filled with ones and the medium page selection bit field 426 also contained a one, the last line of medium page one 424 would be the row of memory being addressed. This corresponds with the last row of big page 412 when the page offset is viewed as a big page offset 410 that contains all ones.

Therefore, in the example case where big page 412 maps 16K rows of memory, medium page zero 422 would map the first 8K rows of memory of big page 412 and medium page one 424 would map the last 8K rows of memory of big page 412. Big page offset 410 would still be a 14 bit field. When viewed as a medium page offset 420 and corresponding medium page selection bit 426, the most significant bit of big page offset 410 would specify whether medium page zero 422 or medium page one 424 was being addressed. The 13 least significant bits ($2^{13}=8K$) of big page offset 410 would then provide the medium page offset 420 of the medium page specified by selection bit 426.

Similarly, big page 412 can be considered to be divided into four small sized pages. This is illustrated by small page zero 432, small page one 434, small page two 436 and small page three 438. In such a case, big page offset 410 can be viewed as being divided into small page selection bits 440 and a small page offset 430. Continuing the example where big page offset 410 is a 14 bit field that specifies a 16 KB page, dividing the big page into four will produce four small pages with each small page having a size of 4 KB. In this example, the two most significant bits ($2^2=4$) of big page offset 410 provide the small page selection bits 440 and the 12 least significant bits ($2^{12}=4K$) of big page offset 410 provide the small page offset 430 into the small page specified by small page selection bits 440.

Although not shown in FIG. 4, it is also possible to combine different sized pages within a particular contiguous portion of memory. Thus big page 412 can alternately be considered to be divided into one medium page and two small pages. Therefore, for example, the first half of big page 412 could be mapped by medium page zero 422 and the last half of big page 412 could be mapped by small page two 436 and small page three 438.

While the example of FIG. 4 shows three page size mappings onto a contiguous portion of memory, more or fewer page sizes can be mapped onto a particular memory portion. Furthermore, so long as each page is comprised of a number of rows that is an integral power of two, smaller page mappings will always fit onto larger page mappings. For example, in an alternate embodiment, there are only two page sizes being mapped. In this alternate embodiment the small page size is 8 KB and the big page size is 64 KB.

A virtual memory computer system can have more than one hardware page size. Whether the computer system has one, or more than one, hardware page size, the computer system will have a minimum hardware page size. The operating system uses pages that are at least the same size as the minimum hardware page size. If the operating system uses one or more page sizes that are larger than the size of a hardware page size, these pages are formed by joining together a sufficient number of contiguous same sized hardware pages to make the operating system page size required. The operating system pages are typically an integral power of two times the size of a hardware page size. Thus, for example, a physical memory can be divided by the computer system into 4 KB sized hardware pages. Rather than perform all virtual memory operations at the hardware page size, the virtual memory operating system can have larger pages which are actually used when transferring pages into memory. Thus, in an example embodiment, even though the hardware page size is 4 KB, the virtual memory operating system can perform operations on pages of size 8 KB and 64 KB. In such a case, each 8 KB operating system page is comprised of two contiguous hardware pages and each 64 KB operating system page is comprised of 16 contiguous hardware pages. In such an example embodiment, 16 contiguous 4 KB hardware sized pages could be viewed as either eight 8 KB operating system small pages or as one 64 KB operating system big page.

Figure 5:
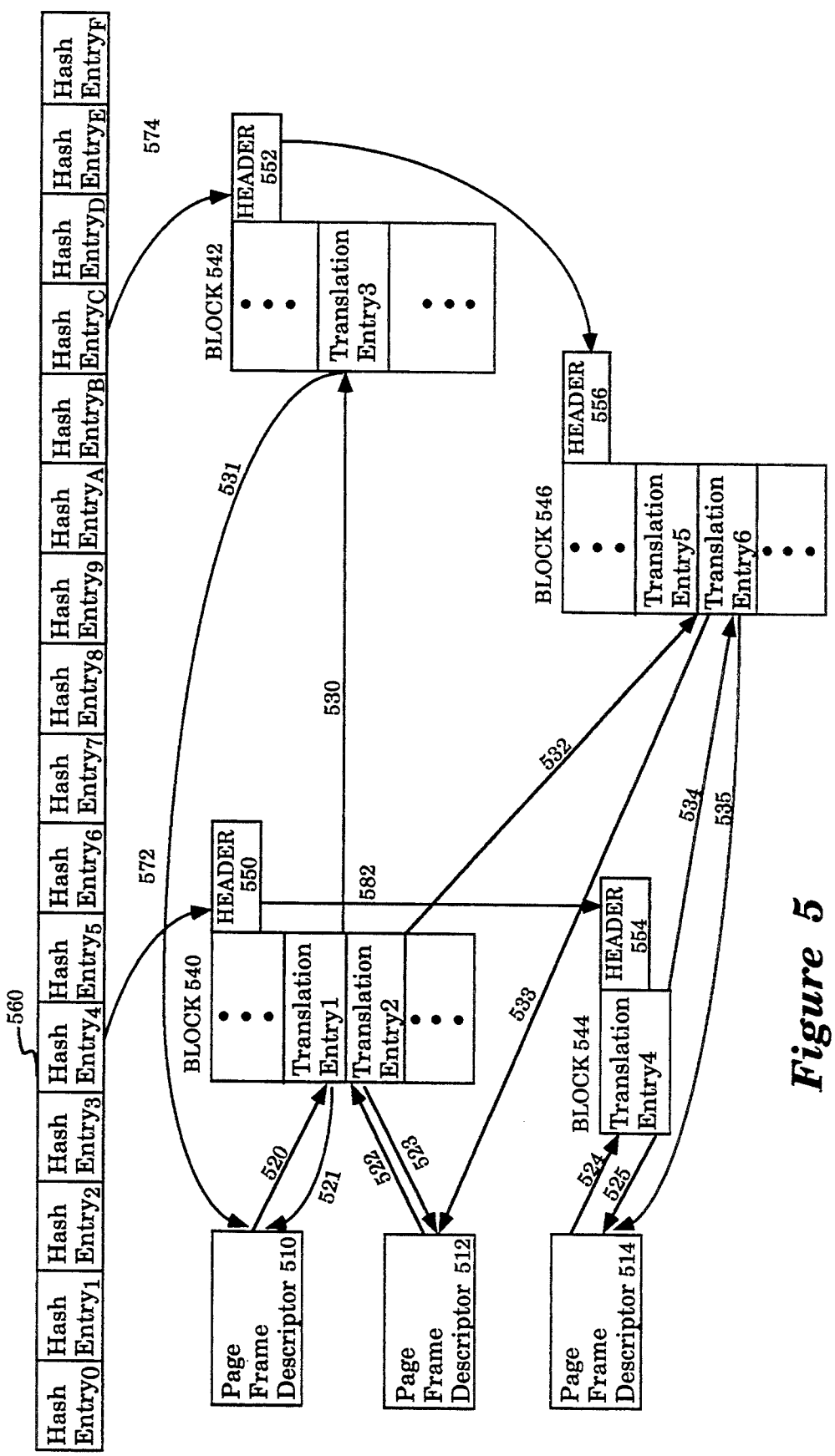
FIG. 5 illustrates an embodiment of an address translation mechanism.

Referring now to FIG. 5, a mechanism is illustrated that permits translations to be made from a virtual address to a physical address. The same mechanism of FIG. 5 can be used to translate a physical address into a virtual address. In the case where more than one virtual address can be mapped to a given physical address, the mechanism of FIG. 5 can be used to determine the virtual addresses of all of the aliases of a given physical address. Furthermore, the mechanism of FIG. 5 permits a physical address to be mapped onto virtual address mappings for more than one page size at the same time. Moreover, the mechanism of FIG. 5 permits a particular contiguous portion of physical memory to be mapped simultaneously using more than one page size.

For ease of presentation, unless otherwise indicated, a primary embodiment will be used throughout the description of FIG. 5. In the primary embodiment there will be two hardware page sizes and the hardware page sizes will be 8 KB and 64 KB. There will be two operating system page sizes, the small operating system page size will be equal to the small hardware page size (i.e. 8 KB) and the big operating system page size will be equal to the big hardware page size (i.e. 64 KB).

In FIG. 5, PFD 510, 512 and 514 are each page frame descriptors that are generated by the virtual memory operating system to describe a particular contiguous area within physical memory that is being used to store an operating system page of information (page frame). The page frame descriptor has a field that identifies the physical address base for the page frame that it describes. This field contains the physical address at the start of the contiguous area within physical memory used to store the page frame being described. The page frame descriptor also has a field that identifies the physical address range of the page frame. A translation pointer field within the page frame descriptor will contain a translation pointer that points to a first virtual address translation for the given page frame if at least one virtual address translation exists. In the case where there are no virtual addresses that correspond to a particular page frame descriptor, the translation pointer field will so indicate. The latter case will occur, for example, when the page frame descriptor describes free memory that has yet to have data loaded into it, or when the page frame descriptor describes a page frame that has had data loaded into it but no active process is currently using the data.

Referring now to blocks 540, 542, 544 and 546, each block represents a translation block for a virtual memory mapping onto physical space. As such, each block represents a contiguous portion of virtual address space. Within the block, a contiguous portion of virtual address space can be mapped as one large page or as several smaller pages. Each translation block has an associated hash index. Each translation block is divided into a header and an array of translation entries. In the primary embodiment, a translation block that represents a big page will only have one translation entry whereas a translation block that represents a small page will have multiple, for example 8, translation entries. Therefore, in the primary embodiment, more memory space will be allocated for translation blocks that correspond to small pages than for translation blocks that correspond to big pages (because the small page translation blocks have more translation entries than the big page translation blocks).

The header of a translation block contains information that pertains to the entire contiguous portion of virtual address space mapped by the translation block. This includes information such as the base virtual address of the portion of memory being mapped, the number of translation entries within the block, the number of valid translation entries, the page size of all translation entries within the block and any other attributes that are common to all of the translation entries within the block. If more than one translation block is associated with the same hash index, the header contains a pointer to the next translation block associated with the particular hash index.

Each of the translation entries is comprised of a valid bit, a page size indicator that indicates the size of the page used by the translation entry, a header indicator used to identify the starting address of the block header, a backward pointer and attributes that are specific to the hardware page that corresponds to the translation entry. The backward pointer points to a page frame descriptor.

In some embodiments, each virtual address will have an associated context number that identifies the context that is using the virtual address. Because the context number is common to all of the virtual addresses mapped by a translation block, it can be stored in the header of the translation block. If context numbers are used, then a virtual address translation will only be valid if the context number stored in the translation block header matches the context associated with the virtual address to be translated. For the purposes of this description, the context number can be thought of as being part of a virtual address.

Thus, in the case where aliasing is not permitted, if a virtual address exists for a particular physical address, the page frame descriptor that describes the page frame that contains the particular physical address will have a translation pointer field that contains a pointer to a translation entry within a translation block. The backward pointer within the translation entry pointed to by the translation pointer will, in turn, point to the page frame descriptor.

This structure will provide the given virtual address translation for a particular physical address if a translation exists. The translation is performed by searching the page frame descriptors until a page frame descriptor is found that describes a page frame containing the physical address to be translated. This operation can be performed because every page frame descriptor has a physical address base field and a range field. There are several techniques that are well known in the art to efficiently search through frame descriptors. Because these techniques are well known in the art, they will not be described in great detail here, typically however, they involve implementing a lookup table data structure of some sort.

Once the page frame descriptor corresponding to the page frame containing the physical address to be translated has been identified, the translation pointer of the page frame descriptor is checked. If the translation pointer indicates that there is no corresponding virtual address for the physical address to be translated, then the translation process completes without providing a translation (because no translation exists). Otherwise, the translation pointer of the page frame descriptor is used to find a corresponding translation entry within a translation block. The header indicator is then used to access the block header to derive information that is used to calculate a virtual address that corresponds to the physical address to be translated. For example, in the primary embodiment, the header will indicate that the translation block describes one big page, has only one translation entry and will provide the base virtual address for the translation block. The page offset for the physical address to be translated can be found by extracting an appropriate number of LSbs of the physical address to be translated (the number of bits to extract depends upon the page size for the translation entry). Adding the page offset to the virtual base address stored in the translation block header will yield the virtual address that corresponds to the physical address to be translated.

If the translation block has more than one translation entry, then the calculation of the translation is slightly more complicated. The header indicator of the translation entry can be used to calculate the position of the translation entry within the translation block. For example, the header indicator can be a pointer to the start of the block header. Because the memory address of the translation entry is known and the size of the header and each translation entry is also known, the position of the translation entry within the translation block can then be calculated. Alternately, the header indicator can be a number that indicates the position of the translation entry within the translation block, the memory address of the start of the header can then be calculated because the size of the header and each translation entry is known. The page offset for the physical address to be translated can be calculated as above. This time, however, one is subtracted from the translation entry position number and the difference is multiplied by the size of memory mapped by a single translation entry. The product is then added to the page offset and that sum is in turn added to the virtual base address stored in the translation block header to yield the virtual address that corresponds to the physical address to be translated.

Furthermore, in the case where aliasing is permitted, a translation entry will have a forward pointer that can point to a translation entry in another translation block (or in the same translation block). The translation entry pointed to by the forward pointer will correspond to an alias for the physical page being described. Thus, a particular page frame descriptor points to a chain of translation entries. Each translation entry in the chain describes one alias for the physical address to be translated. This chain structure permits the retrieval of every virtual address alias for a given physical address.

The physical address to virtual address translation scheme is illustrated in FIG. 5 by a chain that starts at PFD 510. Thus, assuming the physical address to be translated resided in a page described by page frame descriptor 510, a page frame pointer in PFD 510 is found pointing to translation entry TN1 of block 540 as illustrated by arrow 520. Translation entry TN1 provides a first virtual address translation for the physical address to be translated. Furthermore, as can be seen by arrow 530, translation entry TN1 of block 540 has a pointer that points to translation entry TN3 of block 542. Following arrow 530, a second virtual address that maps to the physical address within page frame descriptor 510 is found in translation entry TN3 of block 542. If a third translation existed, a pointer in translation entry TN3 would point to another block containing that translation. In this case, however, there is no arrow emanating from translation entry TN3. Therefore, the end of the translation chain (TN3) has been found and all aliases corresponding to the physical address to be translated have been retrieved.

Similarly, a physical address contained within PFD 512 can be translated by following arrow 522 to translation entry TN2 of block 540 and then by following arrow 532 from TN2 to translation entry TN5 of block 546. As a third example, a physical address contained in page frame descriptor 514 can be translated by following arrow 524 to translation entry TN4 of block 544 and then by following arrow 534 to translation entry TN6 of block 546.

Note that a page frame descriptor representing a large page can have mappings of smaller sizes on its mapping list. In one embodiment, a page frame descriptor can have mappings of different page sizes so long as each page size of the different page sizes is less than, or equal to, the size represented by the page frame descriptor. In such a case, each corresponding translation entry will point back to the same page frame descriptor, however, different translation entries can point back to different regions within the page frame descriptor.

Furthermore, in an alternate embodiment, mappings of a page size larger than the page size of a page frame descriptor can reside on the mapping list of a particular page frame descriptor. In this case, the mappings are sorted by ascending page size in the mapping list. The large mappings only point back to the first page frame descriptor and the translation process is modified to handle this case.

As stated above, the translation mechanism of FIG. 5 can also be used to translate a virtual address into a physical address. This is done by using hash list 560. Hash list 560 is comprised of hash entries ($HE_{0-F}$). Each hash entry contains a pointer that can either be empty or that points to a translation block.

The hash list is selected to be large enough to specify a sufficiently large number of translation blocks. In the example of FIG. 5, hash list 560 has 16 entries, therefore an index into the hash list would be specified by four bits ($2^4=16$). In most embodiments, a much larger hash list would be used. In this example, however, a 16 entry hash list is used to simplify the explanation. In the primary embodiment, a translation block maps 64 KB whether it is a big page translation block with one entry or a small page translation block with eight entries. Because 64K can be expressed by a sixteen bit binary number ($2^{16}=64K$), the hash index would be formed from a virtual address to be translated by extracting the four most significant bits from the twenty (i.e. sixteen plus four) least significant bits of the virtual address to be translated. Thus, referring briefly to FIG. 3, one can see that in the primary embodiment N is equal to 16 and M is equal to four.

Referring again to FIG. 5, the hash index indexes into the hash list which contains a hash entry that may or may not be empty. If the hash entry pointer is empty, then there is no physical address that corresponds to the virtual address to be translated. If the hash entry is not empty, then the pointer stored in the hash entry will point to the header of a first translation block. The first translation block is then examined to determine whether the virtual address to be translated is contained within the first translation block. The range of the translation block begins at the base virtual address (stored in the header) and continues for the maximum number of entries of the translation block times the size of memory described by an individual translation entry within the block. If the virtual address to be translated is within this range, then the first translation block translation entry that would include the virtual address to be translated is examined to see if it is a valid translation entry. If it is not a valid translation entry, then no translation exists. If the translation entry is valid, however, the physical address for the virtual address to be translated can be calculated from the information contained in the first translation block header, the translation entry and the page frame descriptor pointed to by the backward pointer of the translation entry, and the virtual address to physical address translation will have been achieved.

If, on the other hand, the first translation block (i.e. the translation block pointed to by the hash list entry) does not correspond to the virtual address to be translated, then the header of the first translation block is examined to determine whether the header contains an empty pointer or a pointer to another translation block. If the header of the first translation block contains an empty pointer, then no translation exists for the virtual address to be translated. If, on the other hand, the header provides a pointer to a second translation block, then the second translation block is examined to determine whether it corresponds to the virtual address to be translated. The process is repeated until a translation is achieved, a translation block is found that contains the virtual address to be translated in an invalid translation entry or until the translation chain is exhausted.

The virtual address to physical address translation process is complementary to the physical address to virtual address translation process. When translating a virtual address to a physical address, the information of the translation block header is used to find a translation block, and translation entry within the block, that describe the virtual address range containing the virtual address to be translated. Based upon the page size of this translation entry, the appropriate bits of the virtual address to be translated are extracted to form the physical page offset. The backwards pointer of the translation entry is used to locate the page frame descriptor corresponding to the translation entry. Then, the physical address is formed by adding the base physical address of the page frame descriptor to the physical page offset.

The virtual address to physical address translation process is illustrated in FIG. 5 by two examples. In the first example, the hash index extracted from the virtual address to be translated is hash entry $HE_4$ of hash list 560. Examining $HE_4$, a pointer to header 550 of block 540 is found (as illustrated by arrow 572). Header 550 of translation block 540 is then examined to determine whether translation block 550 corresponds to an address space containing the virtual address being translated. If it does and the appropriate translation entry is valid, then the translation has been found and a backward pointer from the appropriate translation entry can be followed back to the PFD that contains the physical address of the virtual address to be translated. If it does and the appropriate translation entry is not valid, then no translation exists. Thus, if the virtual address to be translated was contained within the address space associated with translation entry TN1, backward pointer 521 would be followed back to PFD 510. If on the other hand, the virtual address to be translated was contained within the address space associated with translation entry TN2, backward pointer 523 would be followed back to PFD 512. If the translation block 550 does not correspond to an address space containing the virtual address being translated, then a pointer in header 550 is followed to translation block 544. Translation block 544 is another virtual address mapping having the same hash index. This virtual address mapping is then examined to determine whether the mapping includes the virtual address to be translated. Once again, if it does and the appropriate translation entry is valid, then the translation has been found. If it does and the appropriate translation entry is not valid, then no translation exists and backward pointer 525 can be followed back to PFD 514 from TN4. If the translation block 544 does not correspond to an address space containing the virtual address being translated, then, because the pointer for header 554 is empty, there is no other virtual address mapping to be found and no translation exists for the given virtual address to be translated.

Similarly, in the second example, the hash index extracted from a second virtual address to be translated is hash entry $HE_C$ of hash list 560. Hash entry $HE_C$ points to header 552 of block 542 (as illustrated by arrow 574) and backward pointer 531 points from translation entry TN3 to PFD 510. Header 552 of block 542, in turn, contains a pointer to header 556 of block 546 (as illustrated by arrow 584) and backward pointers 533 and 535 point from translation entries TN5 and TN6 to PFDs 512 and 514, respectively. Note that although in FIG. 5 backward pointers always point from a translation entry to a PFD, in an alternate embodiment, a backward pointer such as pointer 531 of translation entry TN3 could point a translation entry such as TN1. In such a case, the backward pointer from TN3 would be followed to TN1 and then backward pointer 521 of translation entry TN1 would be followed to PFD 510.

Thus, it can be seen that the translation mechanism illustrated in FIG. 5 presents a data structure that can be accessed in two ways. In the first way, by starting with an index into a hash list, the data structure can be accessed to provide a physical address translation for a virtual address to be translated. In the second way, by starting at a page frame descriptor, the data structure can be accessed to provide every virtual address translation corresponding to a given physical address.

In the primary embodiment, the translation blocks were chosen to be sufficiently large to map every page size used by the virtual memory operating system. In such a case, if a translation exists, the translation mechanism of FIG. 5 will always provide a translation in the first hash. The translation mechanism of FIG. 5 works most efficiently if the size of memory mapped by a given translation block is chosen to be such that each translation block is densely populated with valid translation entries and if the most popular page size can be mapped by a translation block. In an alternate embodiment, multiple hash functions are used. Thus, for example, suppose that the primary embodiment were altered so that a small page translation block only had four translation entries (instead of eight). In this alternate embodiment, a small page translation block could map a 32 KB virtual address space and a big page address block would still map a 64 KB address space. Thus, it can be seen that although a big page translation block address space would still be expressed by a sixteen bit binary number, a small page translation block address space would be expressed by a fifteen bit binary number. In this alternate embodiment, when translating from a virtual address to a physical address, two hash indices and translation chains may have to be traversed. A first hash index is extracted from the virtual address to be translated by assuming that the virtual address corresponds to the smaller page sizes. Thus, in the example of FIG. 5, where there is a four bit hash index, the first hash index would be formed by extracting the four most significant bits from the 19 least significant bits of the virtual address to be translated. A translation chain is then checked that begins with the hash entry of the first hash index. If no translation block in the chain is found that includes the virtual address to be translated as part of its address space, then a second hash index is extracted from the virtual address to be translated by assuming that the virtual address to be translated corresponds to a big page size. Thus, continuing the example of FIG. 5, where there is a four bit hash index, the second hash index would be formed by extracting the four most significant bits from the 20 least significant bits of the virtual address to be translated. The second hash index will provide a second hash entry at the base of a second translation chain. In this way, the translation blocks corresponding to each hash list can be kept dense. The amount of memory needed to maintain the translation block structure is thereby minimized.

In an alternate embodiment, there is only one hardware page size (the small page size). In the one hardware page size embodiment, if an individual translation entry of a small page translation block is used, the translation entry will correspond to a hardware page sized portion of physical memory. If an individual translation entry of a big page translation block is used, the translation entry will correspond to a eight contiguous hardware page sized portions of physical memory (eight hardware sized pages times 8 KB per hardware sized pages equals 64 KB or one big sized operating system page). The operating system can then expand the translation entry into multiple translation entries as needed.

Note that although, in the primary embodiment, each hardware page size was the same size as the corresponding operating system page size, this restriction need not hold true. Thus, for example, in an alternate embodiment, the minimum hardware page size could be 4 KB while the operating system small page size could be 8 KB. In such a case, two possible approaches could be used. In the first approach, each translation entry in a small page translation block would correspond to a minimum sized hardware page and two translation entries would be used to describe a small operating system page. In the second approach, there would be only one translation entry in a small page translation block for each small operating system page, then, when a virtual address was being translated to a physical address, the operating system would expand the small page translation block entry into the appropriate number of translation entries as needed.

In a similar manner, the same problem arises when there are multiple sizes of hardware pages and a big operating system page size is a multiple of the big hardware page size. Thus, for example, the primary embodiment can be altered so that there are two hardware page sizes (8 KB and 32 KB). Then, when a big (64 KB) operating system page was represented by a big translation block, if the first approach were used, the big page translation block would have two translation entries (one per 32 KB hardware page). If the second approach were used, the big page translation block would only have one translation entry and the translation entry would be expanded into two translation entries as needed when a virtual address was being translated to a physical address.

In general, if a translation block maps an N bit addressable section of address space (equal to the size of address space mapped by a translation entry times the maximum number of translation entries in a translation block), and further if the hash list index is specified by an M bit number, an index into the hash list for a virtual address to be translated is formed by taking the M least significant bits appearing above the N least significant bits of the virtual address to be translated (as illustrated in FIG. 3). In an alternate embodiment, a different method of computation of the hash index can be used. Thus, for example, in an alternate embodiment, hash index formation is a function of a virtual address and a context number that identifies the context that is using the virtual address.

In another alternate embodiment, a translation block mapping big pages can have more than one valid translation entry. In such a case, a virtual address can potentially be represented in two places (one per page size) with only one place providing the translation. Whenever a different hash index is calculated for each page size, by always starting with the index corresponding to the smallest pages first, the translation block including the virtual address to be translated will always be found first and the search will conclude when this translation block has been found. On the other hand, if a chain is being traversed for a hash index that is the same for more than one page size, and a translation block is found that includes an invalid translation entry that does not correspond to the smallest sized page of the hash index, before the search can complete the rest of the chain must be examined to see whether the chain contains a smaller page size translation block.

Figure 6:
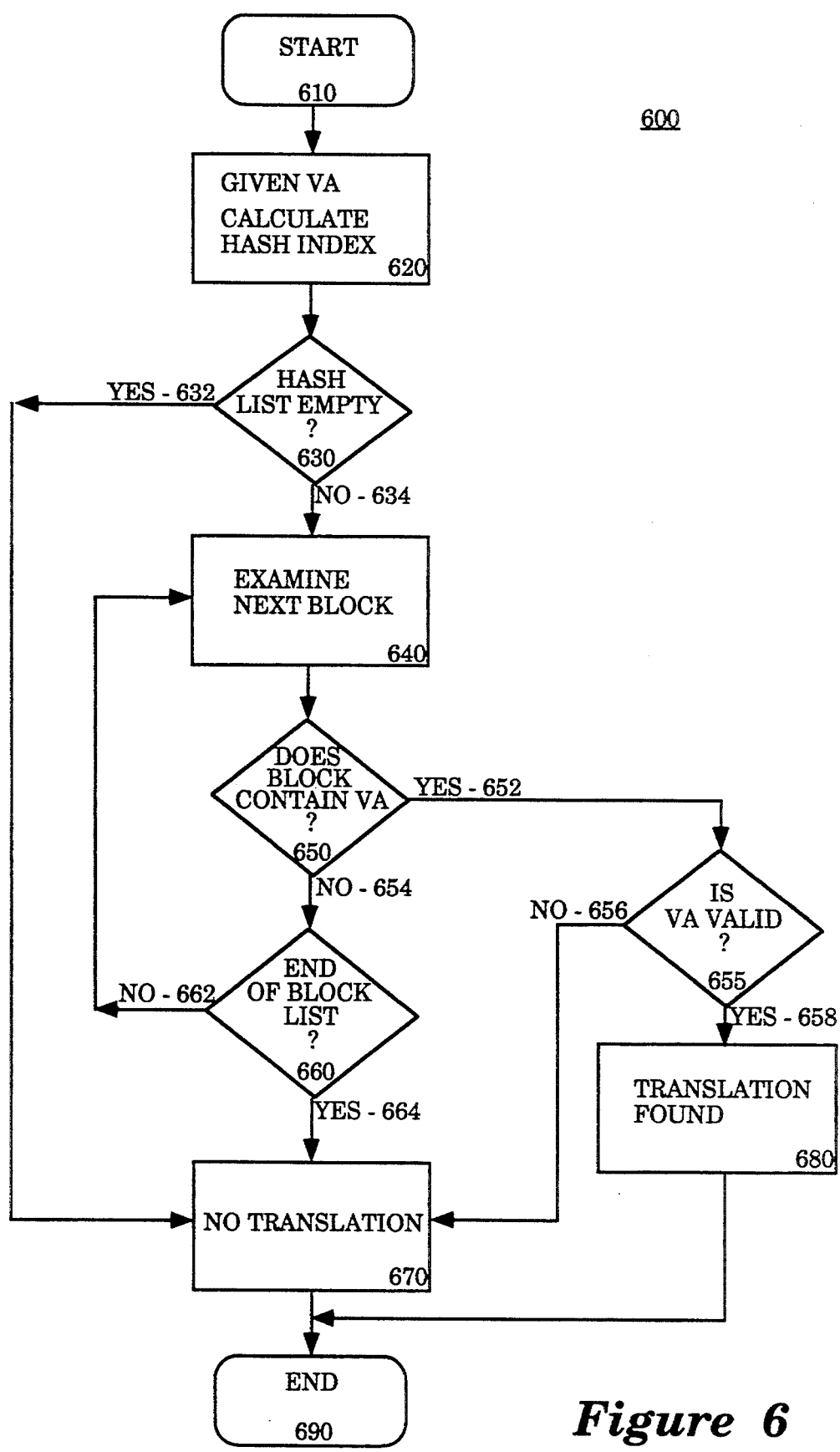
FIG. 6 is a flow chart that depicts the translation from a virtual address to a physical address using the translation mechanism of FIG. 5.

Referring now to FIG. 6, a flow chart is illustrated that depicts a virtual address to physical address translation using the mechanism of FIG. 5. In FIG. 6, the virtual address to physical address translation procedure 600 begins with start bubble 610 and proceeds to process block 620 where a hash index is calculated from the virtual address to be translated. In decision block 630, the hash list is checked to determine whether the hash entry corresponding to the hash index calculated from the virtual address to be translated points to a first translation block, or whether it is empty. If the hash list is empty, then decision path 632 is taken to procedure block 670 where a no translation exists state is declared before the procedure ends at terminal bubble 690. Note that in the case where there were multiple hash indices, the next hash index would be calculated and the procedure would continue at decision block 630 instead of terminating.

Referring again to decision block 630, if the hash list is not empty, then decision path 634 is taken to procedure block 640 where the translation block pointed to by the hash entry is examined. A test is then performed in decision block 650 to determine whether the translation block contains the virtual address to be translated. If the translation block contains the virtual address to be translated, then decision path 652 is taken to decision block 655 where a test is performed to determine whether the translation entry that contains the virtual address to be translated is valid. If the translation is not valid, then decision path 656 is taken to process block where a no translation exists state is declared. Once again, note that in the case where there were multiple hash indices, the next hash index would be calculated and the procedure would continue at decision block 630 instead of terminating. Also note that if a chain is being traversed for a hash index that is the same for more than one page size, and a translation block is found that includes an invalid translation entry that does not correspond to the smallest sized page of the hash index, before the search can complete the rest of the chain must be examined to see whether the chain contains a smaller page translation block.

If, on the other hand, the translation is found in decision block 655 to be valid, then decision path 658 is taken to procedure block 680 where a translation found state is declared. The physical address translation is then calculated before the procedure terminates at terminal bubble 690.

Referring again to decision block 650, if the translation block being examined does not contain the virtual address to be translated, decision path 654 is taken to decision block 660 where a test is performed to determine whether the translation block being examined is the last block on the translation block list. If the pointer in the header of the translation block being examined is empty, then no other translation blocks that have the same hash index exist to be examined and decision path 664 is taken to procedure block 670. The no translation existing state is declared then before procedure ends at terminal bubble 690. Once again, note that in the case where there were multiple hash indices, the next hash index would be calculated and the procedure would continue at decision block 630 instead of terminating.

On the other hand, when the translation block list is examined in decision block 660, if a pointer in the header of the translation block being examined is found that points to another translation block, then decision path 662 is taken to procedure block 640 where the translation block being pointed to is examined. In this way, the translation chain is examined until translation block containing the virtual address to be translated is found, or until the last link of the chain has been examined.

Figure 7:
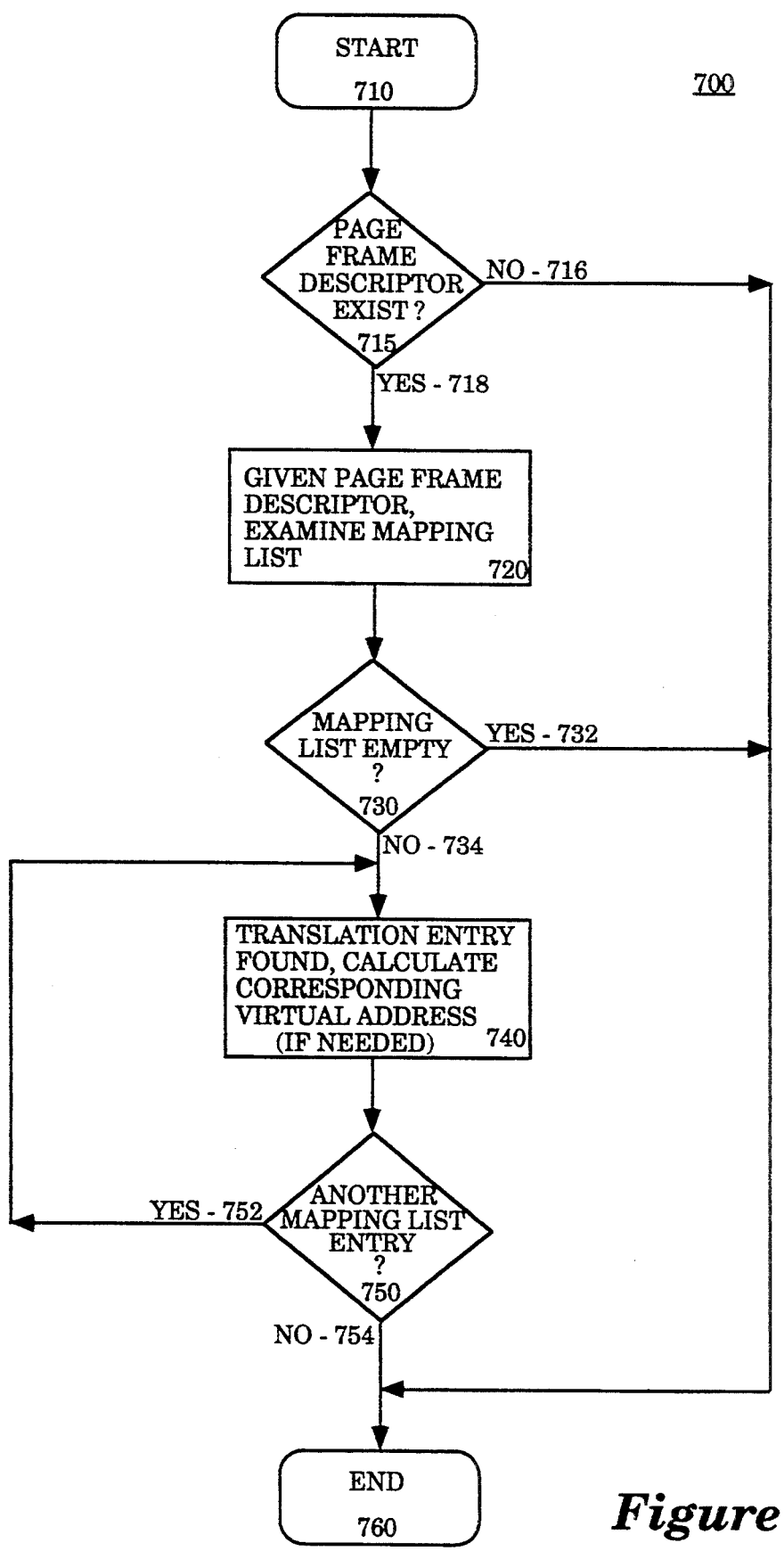
FIG. 7 is a flow chart that depicts the translation from a physical address to a virtual address using the translation mechanism of FIG. 5.

Referring now to FIG. 7, a flow chart is depicted that describes a physical address to virtual address translation. In FIG. 7, the procedure physical address to virtual address translation 700 begins at start bubble 710 and proceeds to decision block 715 where a test is performed to determine whether a page frame descriptor exists that describes a page frame that contains the physical address to be translated. If it is determined in decision block 715 that no such page frame descriptor exists, then decision path 716 is taken to terminal bubble 760 where the procedure terminates without providing a translation (since none exists).

If, on the other hand, it is determined in decision block 715 that a page frame descriptor exists that describes a page frame that contains the physical address to be translated exists, decision path 718 is taken to procedure block 720 where the page frame descriptor that describes a page frame that contains the physical address to be translated is examined to see whether it contains a pointer to a first translation block in its mapping list. If, in decision block 730, it is determined that the pointer within the page frame descriptor containing the physical address to be translated is empty, then no translation exists and decision path 732 is taken to terminal bubble 760 where, once again, the procedure terminates without providing a translation (since none exists).

Referring again to decision block 730, if the mapping list of the page frame descriptor is not empty, then the translation pointer within the page frame descriptor is used to determine a translation entry within a first translation block. In such a case, decision path 734 is taken to process block 740 where the virtual address corresponding to the translation entry is calculated if the actual virtual address is needed (otherwise, for example, the attributes in the translation block are examined or changed). Then, in decision block 750, the translation entry of the translation block being examined is checked to see whether its forward pointer is empty. If the forward pointer is empty, then all virtual addresses corresponding to the physical address to be translated have been identified and decision path 754 is taken to terminal bubble 760 where the procedure ends.

On the other hand, if it is determined in decision block 750 that the forward pointer of the translation entry of the translation block being examined points to another translation entry within another (or the same) translation block, decision path 752 is taken to procedure block 740. In procedure block 740 the next translation entry in the translation list is examined to provide a virtual address alias for the physical address.

The translation process is repeated until the last link in the translation chain has been found and the translation procedure terminates at terminal bubble 760.

While the method and apparatus of the present invention has been described in terms of its presently preferred and alternate embodiments, those skilled in the art will recognize that the present invention may be practiced with modification and alternation within the spirit and scope of the appended claims. The specifications and drawings are, accordingly, to be regarded in an illustrative rather than a restrictive sense.

What is claimed is:

1. A method for providing address translations for a computer system having a virtual memory that is mapped onto a physical memory, the apparatus comprising:

a) providing at least one page frame descriptor for describing a contiguous portion of physical memory, each page frame descriptor having a base physical address, a physical address range beginning at the base physical address and a translation entry pointer;

b) providing at least one translation block for describing a contiguous portion of virtual memory, each translation block having a base virtual address, a virtual address range beginning at the base virtual address, a page size used to map the virtual address range of the translation block, a header and at least one translation entry, each header having a translation block pointer and each translation entry having a backward pointer, each translation entry of the translation block corresponding to a different equal-sized translation range of the virtual address range of the translation block, if the translation range of a translation entry is backed by a physical memory page frame, then the backward pointer of the translation entry points to a describing page frame descriptor that describes a corresponding page frame and the translation entry pointer of the describing page frame descriptor points to the translation entry; and c) providing a hash list having a plurality of hash entries, each hash entry having a translation header pointer and an associated hash index unique to the hash entry, if a virtual address translation chain of at least one translation block exists, wherein each translation block of the virtual address translation chain has a virtual address range such that each virtual address of the virtual address range of a translation block of the virtual address translation chain can be hashed to provide a hash index of a same hash entry, then the translation header pointer of the hash entry having the hash index obtained will point to a first translation block of the virtual address translation chain, if more than one translation block is in the virtual address translation chain then the translation block pointer of the first translation block will point to a second translation block in the virtual address translation chain and every translation block of the virtual address translation chain except the first translation block will be pointed to by a translation block pointer of a different translation block of the virtual address translation chain;

d) if a virtual address to be translated is received, performing steps e) through h);

e) extracting a first translation hash index from the virtual address to be translated;

f) if a hash entry corresponding to the first translation hash index is not empty, then making the translation block pointed to by the translation header pointer of the hash entry corresponding to the first translation hash index a translation block being examined and examining the virtual address range of the translation block being examined to determine whether the virtual address to be translated is contained within the virtual address range of the translation block being examined;

g) if the virtual address to be translated is contained within the virtual address range of the translation block being examined, examining the translation entry of the translation block being examined having a translation range that contains the virtual address to be translated to determine whether the translation entry is valid, if the translation entry is valid, using the backward pointer of the translation entry to locate the page frame descriptor that describes a page frame that is backed by the translation entry;

h) if the virtual address to be translated is not contained within the virtual address range of the translation block being examined, then examining the translation block pointer of the translation block being examined and, if the translation block pointer is not empty, making the translation block pointed to by the translation block pointer of the translation block being examined the translation block being examined and repeating steps g) and h);

i) if a physical address to be translated is received, performing steps j) through m);

j) determining whether a page frame descriptor exists that has a physical address range that contains the physical address to be translated;

k) if a page frame descriptor exists that has a physical address range that contains the physical address to be translated, examining the translation entry pointer of the page frame descriptor to see if the translation entry pointer points to a translation entry;

l) if the translation entry pointer points to a translation entry, making the translation entry pointed to by the translation entry pointer a translation entry being examined;

m) using the translation entry being examined and the header of the translation block containing the translation entry being examined to identify a virtual address corresponding to the physical address being translated.

2. The method as set forth in claim 1 wherein a particular physical page can be mapped by more than one virtual page, the translation entries of the translation blocks further having a forward pointer, if a physical page is mapped by more than one virtual page then a physical address translation chain having at least two translation entries will exist, wherein each translation entry of the physical address translation chain will have a virtual address range corresponding to the physical address range of the physical page described by a page frame descriptor, the translation entry pointer of the describing page frame descriptor will point to a first translation entry of the physical address translation chain, the forward pointer of the first translation entry will point to a second translation entry in the physical address translation chain and every translation entry of the physical address translation chain except the first translation entry will be pointed to by a translation entry pointer of a different translation entry of the physical address translation chain, the method further comprising the step of:

n) successively making every translation entry in the physical address chain containing the translation entry identified in step l) the translation entry being examined and repeating step m).

3. The method as set forth in claim 1 wherein each translation entry further comprises at least one specific attribute, the specific attribute pertaining to the equal-sized translation range of the translation entry.

4. The method as set forth in claim 1 wherein each translation block header further comprises at least one general attribute, the general attribute pertaining to the virtual address range of the translation block.

5. The method as set forth in claim 1 wherein if a virtual address to be translated is received in step d) and performing steps e) through h), at least one additional hash index, different from the first hash index, is formed from the virtual address to be translated and steps e) through h) are repeated using the at least one additional hash index in place of the first translation hash index.

6. A method for providing address translations for a computer system having a virtual memory that is mapped onto a physical memory, the apparatus comprising:

a) providing at least one page frame descriptor for describing a contiguous portion of physical memory, each page frame descriptor having a base physical address, a physical address range beginning at the base physical address and a translation entry pointer;

b) providing at least one translation block for describing a contiguous portion of virtual memory, each translation block having a base virtual address, a virtual address range beginning at the base virtual address, a page size used to map the virtual address range of the translation block, a header and at least one translation entry, each header having a translation block pointer and each translation entry having a backward pointer, each translation entry of the translation block corresponding to a different equal-sized translation range of the virtual address range of the translation block, if the translation range of a translation entry is backed by a physical memory page frame, then the backward pointer of the translation entry points to a describing page frame descriptor that describes the corresponding page frame and the translation entry pointer of the describing page frame descriptor points to the translation entry; and c) providing a hash list having a plurality of hash entries, each hash entry having a translation header pointer and an associated hash index unique to the hash entry, if a virtual address translation chain of at least one translation block exists, wherein each translation block of the virtual address translation chain has a virtual address range such that each virtual address of the virtual address range of a translation block of the virtual address translation chain can be hashed to provide a hash index of a same hash entry, then the translation header pointer of the hash entry having the hash index obtained will point to a first translation block of the virtual address translation chain, if more than one translation block is in the virtual address translation chain then the translation block pointer of the first translation block will point to a second translation block in the virtual address translation chain and every translation block of the virtual address translation chain except the first translation block will be pointed to by a translation block pointer of a different translation block of the virtual address translation chain;

d) receiving a virtual address to be translated;

e) extracting a first translation hash index from the virtual address to be translated;

f) if a hash entry corresponding to the first translation hash index is not empty, then making the translation block pointed to by the translation header pointer of the hash entry corresponding to the first translation hash index a translation block being examined and examining the virtual address range of the translation block being examined to determine whether the virtual address to be translated is contained within the virtual address range of the translation block being examined;

g) if the virtual address to be translated is contained within the virtual address range of the translation block being examined, examining the translation entry of the translation block being examined having a translation range that contains the virtual address to be translated to determine whether the translation entry is valid, if the translation entry is valid, using the backward pointer of the translation entry to locate the page frame descriptor that describes a page frame that is backed by the translation entry;

h) if the virtual address to be translated is not contained within the virtual address range of the translation block being examined, then examining the translation block pointer of the translation block being examined and, if the translation block pointer is not empty, making the translation block pointed to by the translation block pointer of the translation block being examined the translation block being examined and repeating steps g) and h).

7. The method as set forth in claim 6 wherein each translation entry further comprises at least one specific attribute, the specific attribute pertaining to the equal-sized translation range of the translation entry.

8. The method as set forth in claim 6 wherein each translation block header further comprises at least one general attribute, the general attribute pertaining to the virtual address range of the translation block.

9. The method as set forth in claim 6 further comprising the steps of:

i) receiving a physical address to be translated;

j) determining whether a page frame descriptor exists that has a physical address range that contains the physical address to be translated;

k) if a page frame descriptor exists that has a physical address range that contains the physical address to be translated, examining the translation entry pointer of the page frame descriptor to see if the translation entry pointer points to a translation entry;

l) if the translation entry pointer points to a translation entry, making the translation entry pointed to by the translation entry pointer a translation entry being examined;

m) using the translation entry being examined and the header of the translation block containing the translation entry being examined to identify a virtual address corresponding to the physical address being translated.

10. The method as set forth in claim 9 wherein a particular physical page can be mapped by more than one virtual page, the translation entries of the translation blocks further having a forward pointer, if a physical page is mapped by more than one virtual page then a physical address translation chain having at least two translation entries will exist, wherein each translation entry of the physical address translation chain will have a virtual address range corresponding to at least a portion of the physical address range of the physical page described by a page frame descriptor, the translation entry pointer of the describing page frame descriptor will point to a first translation entry of the physical address translation chain, the forward pointer of the first translation entry will point to a second translation entry in the physical address translation chain and every translation entry of the physical address translation chain except the first translation entry will be pointed to by a translation entry pointer of a different translation entry of the physical address translation chain, the method further comprising the step of:

n) successively making every translation entry in the physical address chain containing the translation entry identified in step l) the translation entry being examined and repeating step m).

11. An apparatus for providing address translations for a computer system having a virtual memory that is mapped onto a physical memory, the apparatus comprising:

at least one page frame descriptor for describing a contiguous portion of physical memory, each page frame descriptor having a base physical address, a physical address range beginning at the base physical address and a translation entry pointer;

at least one translation block for describing a contiguous portion of virtual memory, each translation block having a base virtual address, a virtual address range beginning at the base virtual address, a page size used to map the virtual address range of the translation block, a header and at least one translation entry, each header having a translation block pointer and each translation entry having a backward pointer, each translation entry of the translation block a corresponding to a different equal-sized translation range of the virtual address range of the translation block, if the translation range of a translation entry is backed by a physical memory page frame, then the backward pointer of the translation entry points to a describing page frame descriptor that describes the corresponding page frame and the translation entry pointer of the describing page frame descriptor points to the translation entry; and a hash list having a plurality of hash entries, each hash entry having a translation header pointer and an associated hash index unique to the hash entry, if a virtual address translation chain of at least one translation block exists, wherein each translation block of the virtual address translation chain has a virtual address range such that each virtual address of the virtual address range of a translation block of the virtual address translation chain can be hashed to provide a hash index of a same hash entry, then the translation header pointer of the hash entry having the hash index obtained will point to a first translation block of the virtual address translation chain, if more than one translation block is in the virtual address translation chain then the translation block pointer of the first translation block will point to a second translation block in the virtual address translation chain and every translation block of the virtual address translation chain except the first translation block will be pointed to by a translation block pointer of a different translation block of the virtual address translation chain.

12. The apparatus as set forth in claim 11 wherein a particular physical page can be mapped by more than one virtual page, each translation entry of each of the translation block further having a forward pointer, if a physical page is mapped by more than one virtual page then a physical address translation chain having at least two translation entries will exist, wherein each translation entry of the physical address translation chain will have a virtual address range corresponding to at least a portion of the physical address range of the physical page described by a page frame descriptor, the translation entry pointer of the describing page frame descriptor will point to a first translation entry of the physical address translation chain, the forward pointer of the first translation entry will point to a second translation entry in the physical address translation chain and every translation entry of the physical address translation chain except the first translation entry will be pointed to by a translation entry pointer of a different translation entry of the physical address translation chain.

13. The apparatus as set forth in claim 11 wherein each translation entry further comprises at least one specific attribute, the specific attribute pertaining to the equal-sized translation range of the translation entry.

14. The apparatus as set forth in claim 11 wherein each translation block header further comprises at least one general attribute, the general attribute pertaining to the virtual address range of the translation block.

* * * * *

UNITED STATES PATENT AND TRADEMARK OFFICE
CERTIFICATE OF CORRECTION

PATENT NO. : 5,446,854
DATED : August 29, 1995
INVENTOR(S) : Khalidi et al.

It is certified that error appears in the above-indentified patent and that said Letters Patent is hereby corrected as shown below:

In column 1 at line 51, please delete " 37 ".

Signed and Sealed this

Nineteenth Day of November, 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,446,854
DATED : August 29, 1995
INVENTOR(S) : Khalidi et al.

It is certified that error appears in the above-identified patent and that said Letters Patent is hereby corrected as shown below:

In column 20, claim 6 at line 58, please delete " the " and insert -- a --.

In column 22, claim 11 at line 55, please delete " a ".

In column 22, claim 11 at line 61, please delete " the " and insert -- a --.

Signed and Sealed this

Eleventh Day of February, 1997

Attest:

BRUCE LEHMAN

*Attesting Officer*     *Commissioner of Patents and Trademarks*